United States Patent

Mahoney et al.

[15] 3,654,517

[45] Apr. 4, 1972

[54] BUS COUPLER PROTECTION CIRCUIT

[72] Inventors: John Thomas Mahoney, Naperville; Garold Stephen Tjaden, West Chicago, both of Ill.

[73] Assignee: Bell Telephone Laboratories, Incorporated, Murray Hill, Berkeley Heights, N.J.

[22] Filed: Sept. 3, 1970

[21] Appl. No.: 69,368

[52] U.S. Cl. .........................317/33 R, 307/234, 317/36 TD

[51] Int. Cl. ........................................................H01h 47/18

[58] Field of Search .................307/234, 202; 321/5; 328/99; 317/33 SC, 36 TD, 33 R

[56] References Cited

UNITED STATES PATENTS

| | | | |
|---|---|---|---|
| 3,403,269 | 9/1968 | Thompson | 307/234 X |
| 3,309,688 | 3/1967 | Yanishevsky | 307/234 X |
| 3,399,337 | 8/1968 | Stone | 321/5 |

*Primary Examiner*—James D. Trammell
*Attorney*—R. J. Guenther and R. B. Ardis

[57] ABSTRACT

A protection circuit for data bus transmission coupling circuits is provided to protect the coupling circuits from injury due to the application of abnormally long duration pulses. The protection circuit is responsive to data pulses to be transmitted via the coupling circuits and generates inhibit signals to inhibit the coupling circuits upon the occurrence of data pulses of greater than a prescribed duration.

9 Claims, 4 Drawing Figures

Patented April 4, 1972 3,654,517

2 Sheets-Sheet 1

INVENTORS J. T. MAHONEY
G. S. TJADEN
BY R. B. Ardis
ATTORNEY

BUS COUPLER PROTECTION CIRCUIT

BACKGROUND OF THE INVENTION

The invention relates to a transmission bus coupling circuit and more particularly to a circuit for protecting transmission bus coupling circuits from injury resulting from the application of data pulses of longer than a prescribed duration.

Transmission bus coupling circuits comprising a transformer and having a primary winding controlled by a transistor circuit are well known. Generally, these circuits are designed to transmit pulses of relatively short duration and are not designed to withstand a sustained current for any appreciable length of time. However, malfunctions occurring in the pulse generation circuitry may well cause the application of abnormally long data pulses or even a continuous current. Such malfunction is frequently the cause of destruction of the relatively expensive bus coupling circuits.

It is an object of this invention to provide a circuit means which will protect coupling circuits from destruction due to the application of abnormally long data pulses.

It is a further object of this invention to provide a protection circuit which will simultaneously protect a plurality of coupling circuits and which may be tested for proper operation without damaging the coupling circuits.

SUMMARY OF THE INVENTION

In accordance with this invention, a data bus transmission coupling circuit is protected by means of a circuit arrangement which is responsive to data pulses applied to the coupling circuit to inhibit the coupling circuit upon the application of a data pulse of greater than a prescribed duration. In one embodiment of this invention the protection circuit comprises an R-C timing circuit of which the capacitor begins to charge when the leading edge of the applied data pulse appears. The capacitor will reach a predetermined threshold voltage only if the applied data pulse persists for a prescribed period of time. When the threshold voltage is reached, an inhibit pulse is generated and applied to the coupling circuit thereby disabling the coupling circuit until the applied data pulse disappears.

DETAILED DESCRIPTION

Figure 1:
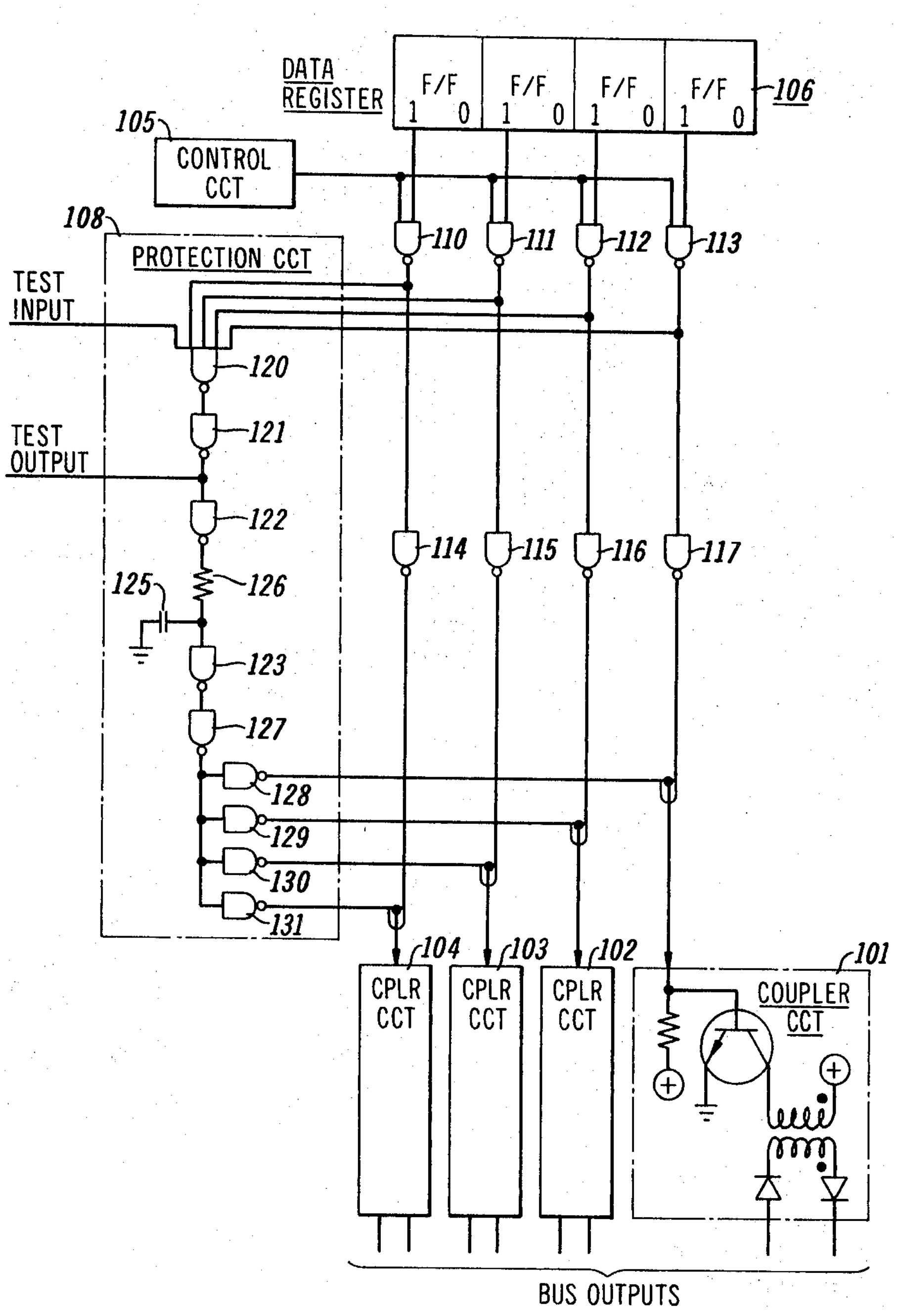
FIG. 1 is an illustrative embodiment of this invention comprising circuits for protecting a plurality of coupling circuits and having test access points.
Figure 3A:
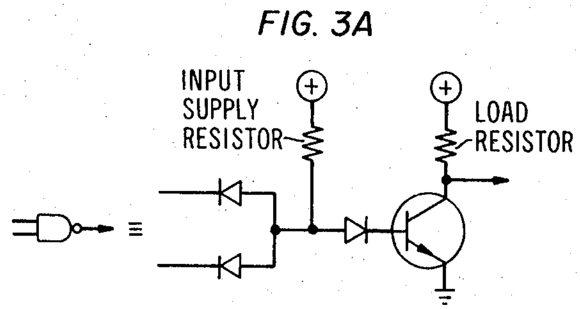
FIGS. 3A and 3B are schematic representations defining the logic symbols employed in this illustrative embodiment.
Figure 3B:
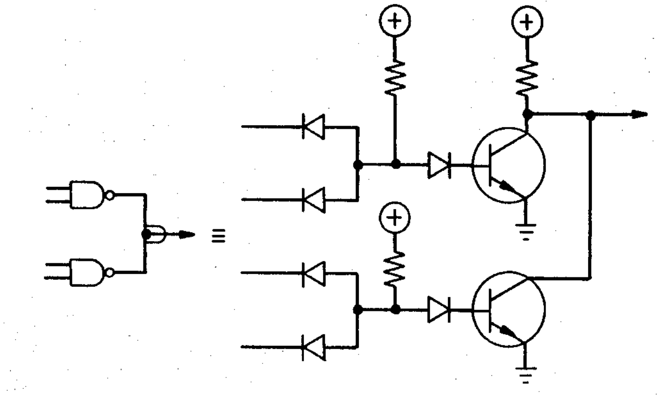

Shown in FIG. 1 are four transmission bus coupler circuits 101 through 103 of a type known in the art and each comprising a transformer controlled by a transistor circuit. Current flows through the primary coil of the transformer only when the transistor is conducting, which can occur only when a signal of a prescribed positive voltage is applied to the base of the transistor circuit. In this illustrative embodiment, data and control pulses are represented by "0's" and "1's" which are physically manifested by a near 0 voltage level and a level of approximately 1 volt, respectively. In this embodiment, the invention is imple-mented using well-known NAND gates which produce a "0" output only when all inputs are "1", and produce a "1" output under all other conditions. It is understood that the invention may also be implemented using other known logic gates. The specific implementation of the NAND gate employed in this illustrative embodiment is shown in FIG. 3A. This circuit comprises an NPN transistor in the grounded emitter configuration, the necessary power supplies and resistors, and two input diodes to which input signals may be connected. It is understood that this configuration is not limited to two inputs and, for example, may also be designed with five input diodes or with a single input, in which case it simply acts as an inverter. FIG. 3B shows a configuration wherein the output terminals of two NAND gates are connected together. Connecting collectors together in the manner shown results in their combined output being at a near zero voltage level when either of the transistors is conducting. Thus, the combined output represents a logical "0" when either of the NAND gates has all "1's" at the input terminals.

FIG. 1 shows a four-bit data register 106 and a control circuit 105 which generates control pulses of approximately 500 nanoseconds duration thereby simultaneously gating data from the data register 106 to the coupling circuits. In this illustrative embodiment, the protection circuit 108 is responsive to the gated data pulses and is operative to simultaneously inhibit all four coupler circuits when a data pulse of greater than 1 millisecond duration is applied to any one of the coupler circuits. The protection circuit may be arranged to inhibit the coupling circuits individually rather than simultaneously by enabling the individual output gates of the protection circuit only when a data pulse is applied to the associated coupler circuit.

Figure 2:
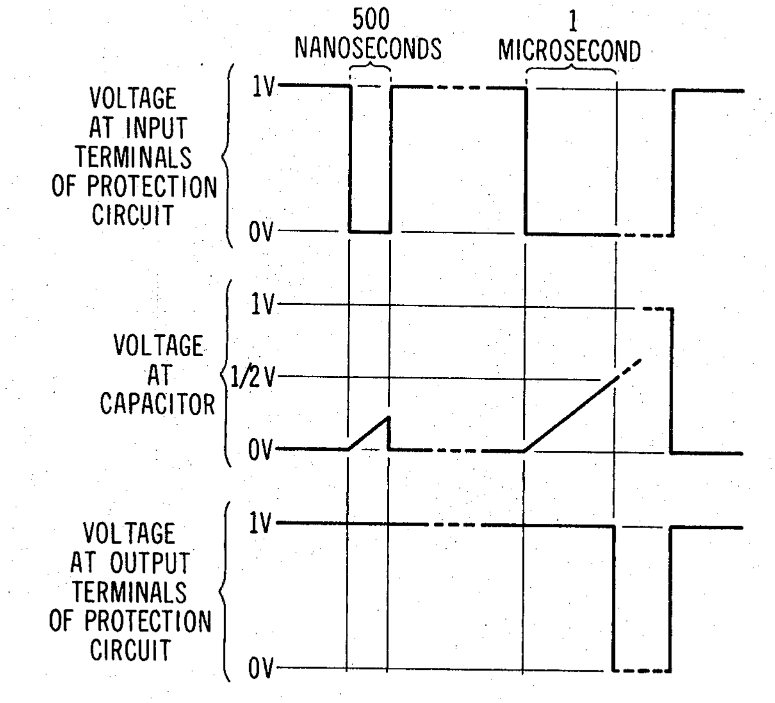
FIG. 2 is a timing diagram showing the time relationships of voltage levels at selected points of the disclosed arrangement.

Under normal conditions, data pulses of approximately 500 nanosecond duration are simultaneously applied to the coupler circuits via the NAND gates 110 through 117 under control of signals from the control circuit 105. Thus, 500 nanosecond pulses are normally transmitted by the coupler circuits 101 through 104. Output terminals of NAND gates 110 through 113 are connected to input terminals of the NAND gate 120, the output of which in turn controls NAND gates 121 and 122. When data in the form of a "0" (i.e., a near 0 voltage) is applied to any of the input terminals of NAND gate 120, the output transistor of NAND gate 122 is turned off, initiating the charging of the capacitor 125. The charging path of capacitor 125 includes the resistor 126, the load resistor of gate 122, and the input diode and base supply resistor of gate 123 (shown in FIG. 3A). The values of this combined resistance and the capacitor have been chosen such that the capacitor charges to approximately 0.5 volts, which is the threshold voltage of NAND gate 123, in approximately 1 microsecond. Since the duration of a nominal data pulse in this illustrative system is approximately 500 nanoseconds, the capacitor will not be charged to this threshold level, under normal operating conditions. The capacitor 125 is discharged through the resistor 126 and the transistor of NAND gate 122 when all signals applied to the input terminals of NAND gate 120 return to "1". Under the condition that one of the data pulses persists for more than 1 microsecond, the threshold input voltage of the NAND gate 123 is exceeded. This gate acts as a simple inverter and causes a "0" to be applied to the input terminal of NAND gate 127, which in turn causes a "0" to appear at the output terminals of NAND gates 128 through 131, causing a near 0 voltage to be applied to each of the coupler circuits thereby inhibiting all four coupler circuits. In this illustrative embodiment, all four coupler circuits remain inhibited as long as a "0" persists at any of the input terminals of NAND gate 120. When all these inputs eventually return to the "1" state, the capacitor is again discharged and thereafter data pulses may be transmitted in the normal manner. FIG. 2 shows the relationship of the voltage levels at the terminals of the protection circuit and at the capacitor.

The protection circuit 108 further comprises a TEST INPUT terminal and a TEST OUTPUT terminal. The operation of the protection circuit may be tested by applying a "0" to the TEST INPUT terminal for more than 1 microsecond, applying data pulses from the data register to the coupler circuits in the normal manner, and simultaneously observing the bus output terminals of the coupler circuits. If the protection circuit is operating properly, no data pulses will be observed on the bus output terminals. The TEST OUTPUT terminal of the protection circuit may be used to determine whether the data pulses applied to the data sources reach the protection circuit, by applying data pulses to the coupler circuits in the normal fashion and observing the TEST OUTPUT terminal.

It is to be understood that the particular embodiment described herein as well as the values recited herein for voltages and time periods are only illustrative and may be adapted for numerous other circuit arrangements without departing from the spirit and scope of this invention. The selection of resistance and capacitor values to obtain the desired charge times is well known and, for the sake of clarity, is not described herein.

What is claimed is:

1. In combination:
a data bus coupling circuit,
a data source for selectively generating data pulses of predetermined duration,
transmission means interconnecting said data source and said coupling circuit for transmitting said data pulses to said coupling circuit, and
circuit means connected to said data source and said coupling circuit and responsive to pulses of greater than said predetermined duration for applying inhibit signals to said coupling circuit.

2. The combination in accordance with claim 1 wherein said circuit means comprises timing means responsive to said data pulses of greater than said predetermined duration for generating said inhibit signals a period of time equal to said predetermined duration after initiation of said last named data pulses.

3. A data transmission arrangement comprising:
a data bus comprising a plurality of individual paths,
bus coupling means associated with each of said paths for transmitting data pulses on said paths,
first control means for simultaneously applying data pulses to each of said coupling means, and
second control means responsive to data pulses of greater than a predetermined duration applied to said coupling means for inhibiting said coupling means.

4. The data transmission arrangement in accordance with claim 3 wherein said second control means comprises timing means responsive to said data pulses greater than said predetermined duration to generate signals for inhibiting said coupling means a period of time equal to said predetermined duration after initiation of said last named data pulses.

5. The data transmission arrangement in accordance with claim 4 wherein said second control means comprises a charge storage means and first and second circuit means,
said first circuit means being responsive to data pulses applied to said coupling means for controlling the charging and discharging of said charge storage means, and
said second circuit means being responsive to the charged state of said charge storage means to generate signals for inhibiting said coupling means.

6. The data transmission arrangement in accordance with claim 5 wherein said first circuit means comprises test input terminals, and
said second control means is responsive to test input signals for inhibiting said coupling means.

7. A data transmission arrangement comprising:
a transformer circuit having a primary and a secondary winding,
a data transmission bus connected to said secondary winding,
a transformer control circuit connected to said primary winding,
a protection circuit connected to said transformer control circuit, and
a data source for generating data pulses to be transmitted on said data bus and connected to said transformer control circuit and said protection circuit,
said protection circuit comprising timing means responsive to said data pulses for generating inhibit pulses to inhibit said transformer control circuit upon the occurrence of data pulses of greater than a prescribed duration.

8. A data transmission arrangement comprising:
a plurality of individual conducting paths;
a plurality of data sources for generating data pulses, said sources being synchronized to initialize data pulses substantially simultaneously;
a plurality of coupling circuits connected between said sources and said conducting paths for applying data pulses generated by said sources to said paths; and
a protection circuit connected to each of said sources and said coupling circuits, and responsive to a data pulse of greater than a predetermined duration generated by any of said sources to inhibit all of said coupling circuits.

9. A data transmission arrangement in accordance with claim 8 wherein said protection circuit comprises charge storage means, first circuit means responsive to data pulses generated by said sources for controlling the charging and discharging of said storage means, and second circuit means responsive to a charged state of said charge storage means for generating inhibit signals to inhibit said coupling circuits.

* * * * *